United States Patent [19]
Takeyama et al.

[11] 3,864,450
[45] Feb. 4, 1975

[54] PROCESS FOR REMOVING NITROGEN OXIDES FROM GASEOUS MIXTURES

[75] Inventors: Tetsu Takeyama; Ryoh Endoh; Keizo Masuda, all of Nagoya, Japan

[73] Assignee: Toray Industries, Inc., Tokyo, Japan

[22] Filed: June 23, 1972

[21] Appl. No.: 265,643

[30] Foreign Application Priority Data
June 24, 1971  Japan.............................. 46-45243

[52] U.S. Cl................................. 423/239, 423/212
[51] Int. Cl............................................ B01d 53/34
[58] Field of Search .......... 423/235, 236, 239, 212, 423/215.5, 213.2; 252/440

[56] References Cited
UNITED STATES PATENTS

| | | | |
|---|---|---|---|
| 2,992,895 | 7/1961 | Feustel et al. ...................... | 423/239 |
| 3,552,912 | 1/1971 | Bartholomew et al.......... | 423/235 X |
| 3,715,187 | 2/1973 | Bartholomew et al.............. | 423/239 |

*Primary Examiner*—Earl C. Thomas

[57] ABSTRACT

Removal of nitrogen oxides from waste gases by contacting the waste gases with hot carbon which contains sodium hydroxide and/or potassium hydroxide.

5 Claims, No Drawings

PROCESS FOR REMOVING NITROGEN OXIDES FROM GASEOUS MIXTURES

BACKGROUND OF THE INVENTION

1. Field of the Invention

This invention relates to a process for the removal of nitrogen oxides from gaseous mixtures. Specifically, the invention relates to a process wherein gaseous mixtures containing nitrogen oxides are contacted with carbon which contains sodium hydroxide and/or potassium hydroxide. This is done at a suitable elevated temperature. The nitrogen oxides in the gaseous mixture are thereby selectively reduced by carbon to nitrogen. This removes the nitrogen oxides from the gaseous mixtures.

2. Description of the Prior Art

In recent years air pollution has become critical in urban areas and has led to harmful effects in humans, other animals and plants. Among air pollutants nitrogen dioxide and nitric oxide (hereinafter denoted as nitrogen oxides) in gaseous mixtures are emitted as waste or by-products by numerous devices which employ combustion processes, such as fossil fuel power plants and automobiles. These pollutants are also emitted by installations which utilize chemical reactions, such as nitric acid plants. Because typical emittors of nitrogen oxides release these pollutants at concentrations ranging from a few hundred to a few thousand parts per million (ppm), an efficient and practical process for the removal of these pollutants from gaseous mixtures has been very much needed.

Three well known methods have been used to remove nitrogen oxides from waste gases. These methods are (1) absorption of the oxides by water or alkali solutions, (2) adsorption by a solid adsorbent such as activated carbon and (3) catalytic reduction. In methods (1) and (2), heavy units of equipment, such as absorption towers, are generally required to treat a large volume of waste gases. It is difficult economically to reduce the concentration of nitrogen oxides in waste gases below 200 ppm using these two methods. In method (3) metals of the platinum group are usually used as catalysts. However, the useful life of these catalysts is not sufficient for the adequate removal of nitrogen oxides from gaseous mixtures. See "Control Techniques for Nitrogen Oxides from Stationary Sources" PB–190265, P. 7—7 (March, 1970) and "Background Information for Proposed New Source Performance Standards: Steam Generators, Incinerators, Portland Cement Plants, Nitric Acid Plants, Sulfuric Acid Plants" PB–202459, P. 41 (August, 1971) for more detail on the problem of useful life of the platinum group metal catalysts. As used herein, adequate removal of nitrogen oxides from gaseous mixtures means the reduction of those oxides to a level of 200 ppm or less in waste gases.

SUMMARY OF THE INVENTION

A prime objective of the present invention is to provide a highly efficient method, which avoids the use of expensive equipment and which uses inexpensive, readily available materials, for the removal of nitrogen oxides from waste gases.

Another objective is to provide a carbon catalyst which selectively reduces nitrogen oxides present in a gaseous mixture containing oxygen. The term "carbon catalyst" as used herein means carbon which contains sodium hydroxide and/or potassium hydroxide.

A further important objective is to provide an economically feasible method for the removal of nitrogen oxides from waste gases wherein the nitrogen oxides are substantially completely removed and the oxygen is not substantially removed, so that unnecessary consumption of the carbon, (the reducing agent), by oxygen is avoided. Using the present invention, nitrogen oxides present in gaseous mixtures are reduced at temperatures between about 250° C and 480° C (preferably between about 300° C and 450° C) by contact with carbon containing sodium hydroxide and/or potassium hydroxide. This partially or completely reduces the nitrogen oxides to nitrogen. The resulting nitrogen is ultimately discharged to the atmosphere. Nitrogen dioxide in the waste gases is substantially completely reduced to nitrogen, though under certain conditions a small amount of nitric oxide is formed as an intermediate product.

The carbon catalyst in the present invention effectively and economically removes nitrogen oxides, in particular nitrogen dioxide, from gaseous mixtures containing nitrogen oxides and oxygen. The catalyst's sodium hydroxide and/or potassium hydroxide content accelerates the reaction between nitrogen oxides and carbon but decelerates the reaction between oxygen and carbon. Thus, most of the oxygen content of the waste gases is discharged without being reduced by carbon. This prevents unnecessary consumption of the carbon catalyst. It is not considered that a carbon catalyst containing other alkali materials, e.g., lithium hydroxide, calcium hydroxide, barium hydroxide, etc., has the merit of the present invention.

DESCRIPTION OF THE PREFERRED EMBODIMENTS

In this invention, carbon may be used in the form of coke, semi-coke, petroleum coke, coal, activated carbon, charcoal, or fly ash. Coke, semi-coke, and petroleum coke are the most suitable. Any of the following three methods can be used for preparation of a carbon catalyst for use in the present invention:

Method 1
Carbon is immersed in a solution of sodium hydroxide and/or potassium hydroxide, and then dried.

Method 2
Carbon is merely blended with sodium hydroxide and/or potassium hydroxide.

Method 3
Carbon is impregnated with sodium nitrate and/or potassium nitrate; this is followed by calcining the carbon at a sufficiently high temperature to decompose the nitrate. Finally, a suitable amount of water vapor is fed over the carbon. This converts the nitrate to the corresponding hydroxide.

The resulting catalyst may contain sodium hydroxide and/or potassium hydroxide in a concentration range from about 0.01 to 30.0 percent by weight of metal based on the weight of the original carbon. When the concentration is less than about 0.01 percent by weight the percentage of nitrogen oxides removed from the gaseous mixture becomes too low. If sodium hydroxide and/or potassium hydroxide is used in a concentration of more than 30 percent by weight the percentage of nitrogen oxides removed does not increase. Also, an economic disadvantage results, in that the additional amount of metallic hydroxide which is used to raise the concentration above 30 percent is not needed.

A carbon catalyst obtained by using any one of the three methods described above may be formulated as spheres, pellets, particles or as a powder, for contacting the gaseous mixture. When carbon is blended with sodium hydroxide and/or potassium hydroxide and then granulated, it is advisable to use a small amount of a binder such as graphite in the granulating step.

The suitable reaction temperature varies to a small extent, depending upon the type of carbon utilized, the concentration of sodium hydroxide and/or potassium hydroxide contained in the carbon catalyst, and the space velocity of the waste gases. The usual range of temperatures for the process is between about 250° and 480° C, with the preferred range being between about 350° and 450° C. When the reaction is carried out at a temperature below 250° C the percentage of nitrogen oxides removed becomes too low and in addition, some of the nitrogen oxides are merely absorbed by the sodium hydroxide and/or the potassium hydroxide without being reduced by the carbon. When the reaction is carried out at a temperature above 480° C, the rate of the reaction between carbon and oxygen increases to such an extent that unnecessary consumption of the carbon cannot be avoided.

The proper space velocity of the waste gases to be treated varies slightly depending upon the concentration of sodium hydroxide and/or potassium hydroxide in the carbon catalyst, the reaction temperature and the particle size of the carbon catalyst. A space velocity in the range between about 1000 and 150,000 and preferably between about 6000 and 80,000, volumes of gas per volume of catalyst per hour is usually used.

Fluid and fixed bed reactors may be used for carrying out this invention. A semi-fluid bed reactor, composed of a fixed bed at the bottom and a fluid bed at the top, may also be used.

The carbon catalyst used in this invention does not become inactive due to impurities such as sulfur compounds. Therefore the efficiency of the carbon catalyst is maintained until its carbon content is substantially completely consumed.

The following examples illustrate the practice of the invention. These examples are not intended to limit the scope of the invention, which is defined in the claims.

In the examples, gaseous analyses were performed as indicated in Table I:

Table I

| Gas | Method |
|---|---|
| NO, $O_2$, CO | Gas chromatography (Molecular sieve 5A column |
| $CO_2$ | Gas chromatography (Porapac-Q column) |
| $NO_2$ | Infra red spectroscopy (at 1640 $cm^{-1}$) |

The measurements were made after the percent of nitrogen oxides removed by absorption had decreased gradually from the initial reading and had leveled off to a constant value. This usually took between 30 and 120 minutes.

EXAMPLE 1

Twenty five grams of semi-coke, 20 to 10 mesh particle size, were immersed in a solution of 30 grams of potassium hydroxide in 70 ml water. This was allowed to stand for 3 hours, and then was dried at 120° C for 3 hours. The carbon catalyst obtained in this manner contained 17 percent by weight potassium hydroxide.

Ten milliliters of this catalyst were placed in a reactor of 12 mm internal diameter pyrex tubing. This was heated to 400° C and maintained at that temperature. A simulated flue gas consisting of 0.23 percent by volume nitrogen dioxide, 0.04 percent by volume nitric oxide, 1.09 percent by volume oxygen, and the balance nitrogen was passed through the catalyst bed at a space velocity of 20,000 volumes of gas per volume of catalyst per hour. The gas leaving the reactor consisted of 0.00 percent by volume nitrogen dioxide, 0.01 percent by volume nitric oxide, 1.03 percent by volume oxygen, 0.28 percent by volume carbon dioxide, a trace of carbon monoxide, and the balance nitrogen. The indicated percentages of nitrogen oxides and oxygen removed from the simulated flue gas were 96.3 and 5.5 respectively.

EXAMPLE 2

A carbon catalyst of semi-coke containing 19 percent by weight sodium hydroxide was prepared as in Example 1. A simulated flue gas consisting of 0.43 percent by volume nitrogen dioxide, 0.06 percent by volume oxide, 0.78 percent oxygen, and the balance nitrogen was passed through the catalyst bed under the same conditions as described in Example 1.

The gas leaving the reactor consisted of 0.00 percent by volume nitrogen dioxide, 0.02 percent by volume nitric oxide, 0.75 percent by volume oxygen, 0.45 percent by volume carbon dioxide, 0.00 percent carbon monoxide, and the balance nitrogen. The indicated percentages of nitrogen oxides and the oxygen removed from the simulated flue gas were 95.9 and 3.9 respectively.

CONTROL 1

A carbon catalyst containing 9.0 percent by weight lithium hydroxide was prepared and tested under the same conditions as Example 1.

The gas leaving the reactor consisted of a trace of nitrogen dioxide, 0.11 percent by volume nitric oxide, 0.25 percent by volume oxygen, 0.76 percent by volume carbon dioxide, 0.13 percent by volume carbon monoxide, and the balance nitrogen. The indicated percentages of nitrogen oxides and oxygen removed from the simulated flue gas were 59.3 and 77.1 respectively.

CONTROL 2

Semi-coke was tested as in Example 1. The gas leaving the reactor consisted of 0.03 percent by volume nitrogen dioxide, 0.15 percent by volume nitric oxide, 0.80 percent by volume oxygen, 0.28 percent by volume carbon dioxide, 0.07 percent by volume carbon monoxide, and the balance nitrogen. The indicated percentages of nitrogen oxides and oxygen removed from the simulated flue gas were 33.3 and 26.6 respectively.

EXAMPLE 3

The carbon catalyst obtained in Example 1 was tested at 480° C. as in Example 1. The gas leaving the reactor consisted of 0.00 percent by volume nitrogen dioxide, 0.02 percent by volume nitric oxide, 0.53 percent by volume oxygen, 0.78 percent by volume carbon dioxide, 0.00 percent by volume carbon monoxide, and the balance nitrogen. The indicated percentages of nitrogen oxides and oxygen removed from the simulated flue gas were 92.6 and 51.4 respectively.

EXAMPLE 4

A carbon catalyst of coke containing 16.0 percent by weight potassium hydroxide was prepared as in Example 1 and tested at temperatures between 230° C and 530° C. The gaseous hourly space velocity was 20,000 volumes of gas per volume of catalyst per hour. A simulated flue gas consisting of 0.18 percent by volume nitrogen dioxide, 0.02 percent by volume nitric oxide, 1.28 percent by volume oxygen, and the balance nitrogen was used. The results obtained are shown in Table II.

tion of 10 grams sodium hydroxide in 90 ml of water. This was allowed to stand for 6 hours, and then was dried at 120° C for 3 hours. Simulated flue gas, the same as used in Example 2, was passed through the catalyst bed at a space velocity of 8,000 volumes of gas per volume of catalyst per hour. The catalyst bed was maintained at 400° C. The gas leaving the reactor consisted of a trace of nitrogen dioxide, 0.02 percent by volume nitric oxide, 0.76 percent by volume oxygen, 0.41 percent by volume carbon dioxide, a trace of carbon monoxide, and the balance nitrogen. The indicated percentages of nitrogen oxides and oxygen removed from the simulated flue gas were 95.9 and 2.6 respectively.

Table II

| Temperature, °C | Treated Gas Composition, Percent by volume | | | | | | Gas Removed, Percent | |
|---|---|---|---|---|---|---|---|---|
| | $NO_2$ | NO | $O_2$ | $CO_2$ | CO | $N_2$ | $NO_x$* | $O_2$ |
| Control 230 | 0.00 | 0.16 | 1.28 | 0.01 | 0.00 | balance | 20.0 | 0.0 |
| 280 | 0.00 | 0.13 | 1.28 | 0.04 | 0.00 | balance | 35.0 | 0.0 |
| 350 | 0.00 | 0.09 | 1.27 | 0.10 | 0.00 | balance | 55.0 | 0.8 |
| 400 | 0.00 | 0.02 | 1.28 | 0.15 | 0.00 | balance | 90.0 | 0.0 |
| 450 | 0.00 | 0.02 | 1.07 | 0.38 | 0.00 | balance | 90.0 | 16.4 |
| Control 550 | 0.00 | 0.01 | 0.28 | 1.18 | 0.00 | balance | 95.0 | 78.1 |

*$NO_x$ denotes $NO_2$ and NO.

EXAMPLE 5

A carbon catalyst of semi-coke, 32 to 20 mesh particle size, containing 18.0 percent (weight) potassium hydroxide was prepared as in Example 1. A simulated flue gas consisting of 0.18 percent by volume nitrogen dioxide, 0.04 percent by volume nitric oxide, 1.26 percent by volume oxygen and the balance nitrogen was passed through the catalyst bed. The temperature was maintained at 400° C and a space velocity of 50,000 volumes of gas per volume of catalyst per hour was used. This made the catalyst fluidized. The gas leaving the reactor consisted of 0.00 percent by volume nitrogen dioxide, 0.02 percent by volume nitric oxide, 1.24 percent by volume oxygen, 0.19 percent by volume carbon dioxide, 0.00 percent by volume carbon monoxide, and the balance nitrogen. The indicated percentages of nitrogen oxides and oxygen removed from the simulated flue gas were 90.9 and 1.6 respectively.

EXAMPLE 6

The carbon catalyst obtained in Example 4 was tested at 400° C under fluidized conditions. The simulated flue gas of the same composition as in Example 4 was passed through the catalyst bed at a space velocity of 83,000 volumes of gas per volume of catalyst per hour. The gas leaving the reactor consisted of 0.00 percent by volume nitrogen dioxide, 0.03 percent by volume nitric oxide, 1.28 percent by volume oxygen, 0.16 percent by volume carbon dioxide, a trace of carbon monoxide, and the balance nitrogen. Eighty-five percent (85.0 percent) of the nitrogen oxides were removed but no oxygen was removed from the simulated flue gas.

EXAMPLE 7

A carbon catalyst containing 8.0 percent by weight sodium hydroxide was prepared by immersing 25 grams of semi-coke, 20 to 10 mesh particle size, into a solu-

EXAMPLE 8

Carbon catalysts containing various amounts of potassium hydroxide were prepared from petroleum coke, 20 to 10 mesh particle size. These catalysts were tested at 400° C with a gaseous space velocity of 10,000 volumes of gas per volume of catalyst per hour. A simulated flue gas consisting of 0.19 percent by volume nitrogen dioxide, 0.02 percent by volume nitric oxide, 2.04 percent by volume oxygen, and the balance nitrogen was used. The data collected are presented in Table III.

Table III

| KOH Concentration (Percent by weight) | Percent Removed from Simulated Flue Gas | |
|---|---|---|
| | $NO_x$* | $O_2$ |
| 1.5 | 31.0 | 15.0 |
| 4.2 | 55.0 | 8.0 |
| 8.5 | 82.0 | 3.0 |

* $NO_x$ denotes NO and $NO_2$.

EXAMPLE 9

A carbon catalyst containing 13.0 percent by weight potassium hydroxide was prepared by immersing 25 grams of petroleum coke (10 to 20 mesh particle size) in a solution of 50 grams potassium hydroxide in 50 ml of water. This was allowed to stand for 5 hours, and then was dried at 130° C for 5 additional hours. The resulting catalyst was tested under the same conditions as in Example 8. The test was extended until the percentage of nitrogen oxides removed from the simulated flue gas decreased considerably due to the consumption of carbon by nitrogen oxides and oxygen. The results obtained are shown in Table IV.

Table IV

| Time (hours) | Percent Removed | |
| --- | --- | --- |
| | NO$_x$ | O$_2$ |
| 1 | 92.5 | 0.4 |
| 2 | 92.5 | 0.4 |
| 4 | 92.5 | 0.4 |
| 6 | 92.5 | 0.0 |
| 8 | 92.5 | 1.6 |
| 11 | 92.5 | 2.3 |
| 14 | 92.5 | 1.8 |
| 31 | 92.5 | 0.9 |
| 35 | 92.5 | 2.3 |
| 39 | 91.5 | 0.9 |
| 43 | 90.5 | 1.5 |
| 46 | 75.5 | 0.0 |
| 48 | 70.5 | 0.0 |
| 50 | 66.5 | 0.0 |
| 52 | 59.0 | 0.0 |

The amount of carbon consumed during this test was 6.8 grans, compared to 6.3 grams calculated by theory.

The following is claimed:

1. In a process for the removal of a nitrogen oxide impurity from a gaseous mixture, wherein the gaseous mixture subjected to the treatment contains both a nitrogen oxide impurity and oxygen, the steps comprising contacting the gaseous mixture with a catalyst consisting essentially of carbon impregnated with sodium hydroxide or potassium hydroxide, while maintaining said catalyst at a temperature in the range from about 250° C. to 480° C.

2. The process according to claim 1 wherein the reaction temperature is between about 350° C and 450° C.

3. The process according to claim 1 wherein the concentration of said alkali metal hydroxide contained in the carbon catalyst is from about 2.0 to 20.0 percent by weight of metal based upon the weight of the original carbon.

4. The process according to claim 1 wherein the carbon is selected from the group consisting of coke, semi-coke, and petroleum coke.

5. The process according to claim 1 wherein the gaseous mixture is passed through the catalyst bed at a space velocity from about 6,000 to 80,000 volumes of gas per volume of catalyst per hour.

* * * * *